(12) United States Patent
Yamaoka

(10) Patent No.: US 9,522,700 B2
(45) Date of Patent: Dec. 20, 2016

(54) DRIVING SUPPORT APPARATUS FOR VEHICLE AND DRIVING SUPPORT METHOD

(71) Applicant: TOYOTA JIDOSHA KABUSHIKI KAISHA, Toyota-shi, Aich-ken (JP)

(72) Inventor: Masaaki Yamaoka, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/884,133

(22) Filed: Oct. 15, 2015

(65) Prior Publication Data

US 2016/0107687 A1    Apr. 21, 2016

(30) Foreign Application Priority Data

Oct. 16, 2014 (JP) .................................. 2014-211861

(51) Int. Cl.
*B62D 5/00* (2006.01)
*B62D 15/00* (2006.01)
*B62D 15/02* (2006.01)

(52) U.S. Cl.
CPC ......... *B62D 15/025* (2013.01); *B62D 15/0255* (2013.01)

(58) Field of Classification Search
CPC combination set(s) only.
See application file for complete search history.

(56) References Cited

U.S. PATENT DOCUMENTS

| 8,605,947 | B2 * | 12/2013 | Zhang | ................ G06K 9/00798 348/116 |
| 2004/0158377 | A1 * | 8/2004 | Matsumoto | ......... B60T 8/17557 701/48 |
| 2006/0217860 | A1 * | 9/2006 | Ihara | .................... B62D 15/025 701/41 |
| 2010/0191421 | A1 * | 7/2010 | Nilsson | ................ B62D 15/025 701/41 |
| 2011/0130936 | A1 | 6/2011 | Noda | |
| 2013/0253793 | A1 * | 9/2013 | Lee | ..................... B60W 50/029 701/70 |
| 2014/0032049 | A1 * | 1/2014 | Moshchuk | ......... B62D 15/0265 701/42 |

FOREIGN PATENT DOCUMENTS

| JP | 2005-162014 A | 6/2005 |
| JP | 2011-113511 A | 6/2011 |

* cited by examiner

*Primary Examiner* — Yonel Beaulieu
(74) *Attorney, Agent, or Firm* — Sughrue Mion, PLLC

(57) ABSTRACT

A driving support apparatus has a controller that performs a lane keeping assist that controls a vehicle such that the lateral position of the vehicle is a target lateral position in a running lane, recognizes a lane change operation by the driver for a lane change of the vehicle from the running lane to an adjacent lane, and, when it is determined that steering torque in a lane change direction by the driver has changed from a predetermined threshold or more to less than the predetermined threshold after the lane change operation is recognized and before it is determined that a previously set lane change operation termination condition has been met, sets the lateral position of the vehicle at the time of the determination as the target lateral position.

7 Claims, 7 Drawing Sheets

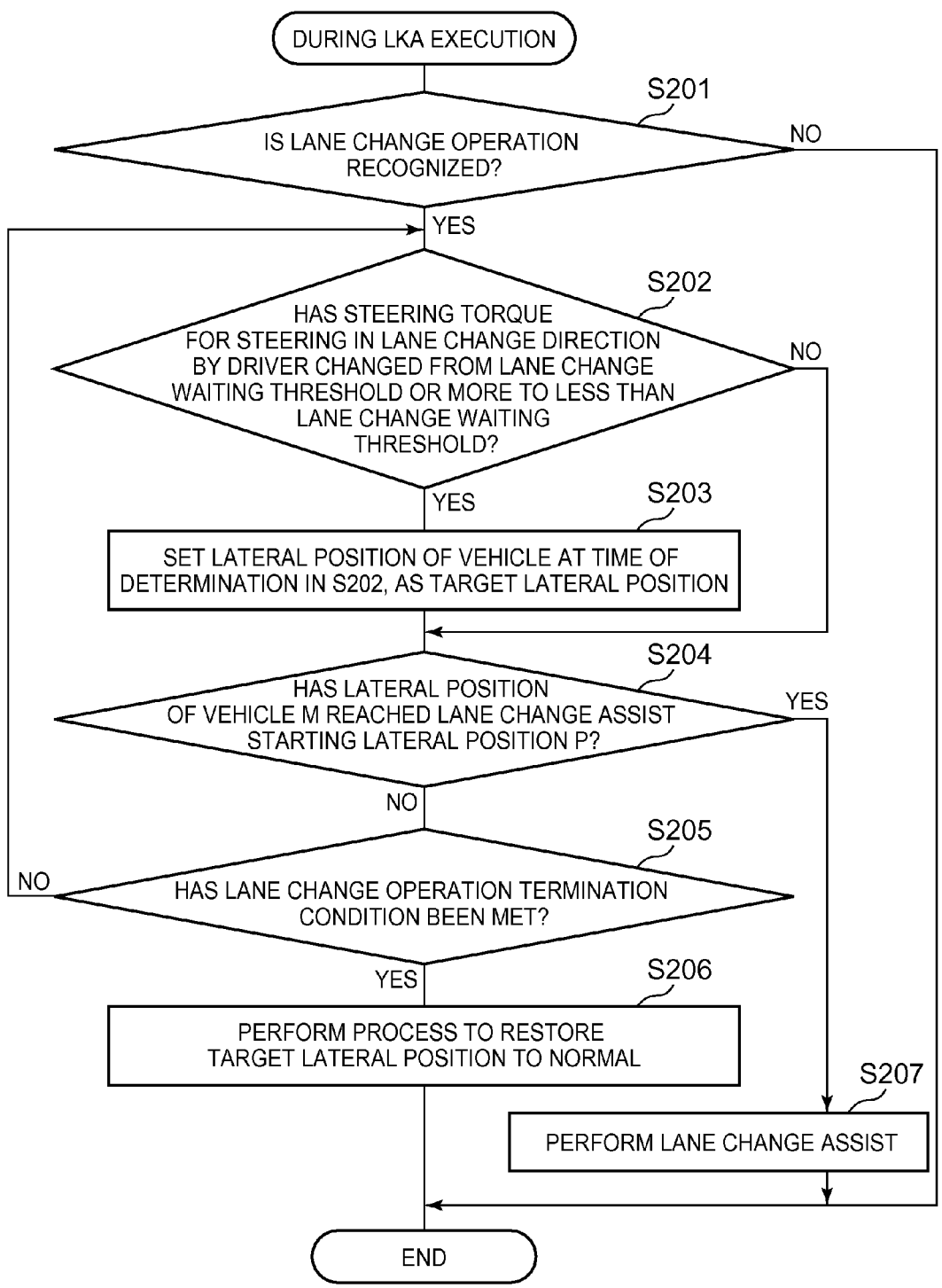

DRIVING SUPPORT APPARATUS FOR VEHICLE AND DRIVING SUPPORT METHOD

INCORPORATION BY REFERENCE

The disclosure of Japanese Patent Application No. 2014-211861 filed on Oct. 16, 2014 including the specification, drawings and abstract is incorporated herein by reference in its entirety.

BACKGROUND OF THE INVENTION

1. Field of the Invention

The invention relates to a driving support apparatus for a vehicle that performs a lane keeping assist for the vehicle, and a driving support method.

2. Description of Related Art

Conventionally, as a technical literature relevant to a driving support apparatus that performs a lane keeping assist for a vehicle, for example, Japanese Patent Application Publication No. 2005-162014 is known. The publication shows a lane following apparatus that controls the steering of a vehicle such that the vehicle follows a target line set in a running lane. In the lane following apparatus, at the ordinary time, the greater the deviation amount in the vehicle width direction between the target line and the running line of the vehicle is, the greater the gain of the steering torque in a direction of returning the vehicle to the target line is.

By the way, during the execution of the lane keeping assist, in the case of making a lane change from the running lane to an adjacent lane, a driver needs to make the vehicle go toward the adjacent lane while resisting the steering torque in the direction of returning the vehicle to the target line of the running lane. If the lane keeping assist, for avoiding this, is canceled in response to the operation of a direction indicator lever, it is likely to give the driver uneasy feeling, because the lane keeping assist is canceled, for example, even when the direction indicator lever is operated by a wrong operation or the like.

Hence, during the execution of the lane keeping assist, when it is determined that the vehicle makes a lane change, the above-described related lane following apparatus suppresses the increase in the gain of the steering torque even when the deviation amount between the running line of the vehicle and the target line becomes great, and thereby, inhibits the vehicle from being easily returned to the target line of the running lane. However, in the related lane following apparatus, for example, even when the driver weakens the steering torque and temporarily waits for seeing the appearance of the adjacent lane in the middle of the lane change, the driver needs to resist the steering torque given by the lane keeping assist for returning the vehicle to the target line, and sometimes feels uncomfortable.

SUMMARY OF THE INVENTION

Hence, an aspect of the invention provides a driving support apparatus for a vehicle that can inhibit the driver from feeling uncomfortable in the lane change during the execution of the lane keeping assist, and a driving support method.

A driving support apparatus for a vehicle according to an aspect of the invention includes a controller, the controller performing a lane keeping assist that controls a vehicle such that the position of the vehicle in a width direction of a lane is a target lateral position in a lane along which the vehicle is running and that reflects steering by a driver of the vehicle in running of the vehicle, the controller recognizing a lane change operation by the driver, the lane change operation being an operation by which the vehicle makes a lane change from the running lane along which the vehicle is running, to an adjacent lane, the controller setting a lateral position of the vehicle as the target lateral position, when it is determined that steering torque of the steering in a lane change direction by the driver has changed from a predetermined threshold or more to less than the predetermined threshold, the lateral position of the vehicle being the lateral position of the vehicle at the time of the determination, the determination being made, during execution of the lane keeping assist, after the lane change operation is recognized and before it is determined that a previously set lane change operation termination condition has been met.

In the driving support apparatus according to an aspect of the invention, during the execution of the lane keeping assist, after the lane change operation (for example, the switching of a direction indicator lever to an ON state) by the driver is recognized and before it is determined that the lane change operation termination condition has been met (for example, the switching of the direction indicator lever to an OFF state has been performed), when it is determined that the steering torque of the steering in the lane change direction by the driver has changed from the lane change waiting threshold or more to less than the lane change waiting threshold, the lateral position of the vehicle at the time of the determination is set as the target lateral position for the lane keeping assist. Therefore, in the driving support apparatus, for example, even when the driver temporarily waits in the lane change and weakens the steering torque to less than the lane change waiting threshold for seeing the appearance of the adjacent lane in the middle of the lane change, since the lateral position of the vehicle when the steering torque by the driver becomes less than the lane change waiting threshold is set as the target lateral position for the lane keeping assist, it is possible to avoid giving the steering torque by the lane keeping assist for returning the vehicle to an initial target lateral position (for example, a central position of the running lane), it is possible to keep the lateral position of the vehicle during the temporary waiting without the driver's resistance against the steering torque by the lane keeping assist, and it is possible to inhibit the driver from feeling uncomfortable.

When it is determined that the lateral position of the vehicle has reached a previously set lane change assist starting lateral position, the controller of the above driving support apparatus may terminate the lane keeping assist and may start a lane change assist that supports the lane change by the driver, the determination being made, during the execution of the lane keeping assist, after the lane change operation is recognized and before it is determined that the lane change operation termination condition has been met. According to the driving support apparatus, when the lateral position of the vehicle has reached the lane change assist starting lateral position after the lane change operation by the driver is recognized and before it is determined that the lane change operation termination condition has been met, it is thought that the lane change operation is not a mistake and the driver has moved the vehicle with the intention of the lane change. Therefore, in this case, the lane keeping assist is terminated, and the lane change assist is started. Consequently, according to the driving support apparatus, compared to the related apparatus that starts the lane change assist from the lane keeping assist only by the lane change operation, it is possible to avoid the termination of the lane keeping assist and the start of the lane change assist when the driver performs the lane change operation by mistake, and it is possible to perform the termination of the lane keeping assist and the start of the lane change assist at an adequate timing when the vehicle reaches the lane change assist starting lateral position.

When the lateral position of the vehicle has reached a position a previously set first distance away from a central position of the running lane toward the lane change direction in the width direction of the running lane, the controller of the above driving support apparatus may determine that the lateral position of the vehicle has reached the lane change assist starting lateral position. According to the driving support apparatus, when the lateral position of the vehicle has reached the position the previously set first distance away from the central position of the running lane toward the lane change direction after the lane change operation by the driver is recognized and before the lane change operation termination condition is met, it is thought that the driver has pulled over the vehicle from the central position of the running lane to the adjacent lane side with the intention of the lane change. Therefore, in this case, the lane keeping assist is terminated, and the lane change assist is started. Thereby, it is possible to perform the termination of the lane keeping assist and the start of the lane change assist at an adequate timing.

When the lateral position of the vehicle has reached a position a previously set second distance away from the target lateral position toward the lane change direction in the width direction of the running lane, the controller of the above driving support apparatus may determine that the lateral position of the vehicle has reached the lane change assist starting lateral position. According to the driving support apparatus, when the lateral position of the vehicle has reached the position the previously set second distance away from the target lateral position toward the lane change direction after the lane change operation by the driver is recognized and before the lane change operation termination condition is met, it is thought that the driver has moved the vehicle from the target lateral position to the adjacent lane side with the intention of the lane change. Therefore, in this case, the lane keeping assist is terminated, and the lane change assist is started. Thereby, it is possible to perform the termination of the lane keeping assist and the start of the lane change assist at an adequate timing.

When the lateral position of the vehicle has reached a position a previously set third distance away from a lane line inward of the running lane in the width direction of the running lane, the controller of the above driving support apparatus may determine that the lateral position of the vehicle has reached the lane change assist starting lateral position, the lane line being a boundary between the running lane and the adjacent lane. According to the driving support apparatus, when the lateral position of the vehicle has reached the position the previously set third distance away from the lane line, which is the boundary between the running lane and the adjacent lane, inward of the running lane after the lane change operation by the driver is recognized and before the lane change operation termination condition is met, it is thought that the driver has moved the vehicle close to the lane line with the intention of the lane change. Therefore, in this case, the lane keeping assist is terminated, and the lane change assist is started. Thereby, it is possible to perform the termination of the lane keeping assist and the start of the lane change assist at an adequate timing.

In the driving support apparatus according to an aspect of the invention, in the lane change during the execution of the lane keeping assist, it is possible to inhibit the driver from feeling uncomfortable.

A driving support method for a vehicle according to another aspect of the invention includes: a step of performing a lane keeping assist that controls a vehicle such that the position of the vehicle in a width direction of a lane is a target lateral position in a lane along which the vehicle is running and that reflects steering by a driver of the vehicle in running of the vehicle; a step of recognizing a lane change operation by the driver, the lane change operation being an operation by which the vehicle makes a lane change from the lane along which the vehicle is running, to an adjacent lane; and a step of setting a lateral position of the vehicle as the target lateral position, when it is determined that steering torque of the steering in a lane change direction by the driver has changed from a predetermined threshold or more to less than the predetermined threshold, the lateral position of the vehicle being the lateral position of the vehicle at the time of the determination, the determination being made, during execution of the lane keeping assist, after the lane change operation is recognized and before it is determined that a previously set lane change operation termination condition has been met.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a flowchart showing a driving support method of the driving support apparatus according to the second embodiment.

DETAILED DESCRIPTION OF EMBODIMENTS

Hereinafter, preferred embodiments of the invention will be described in detail, with reference to the drawings.

First Embodiment

Figure 1:
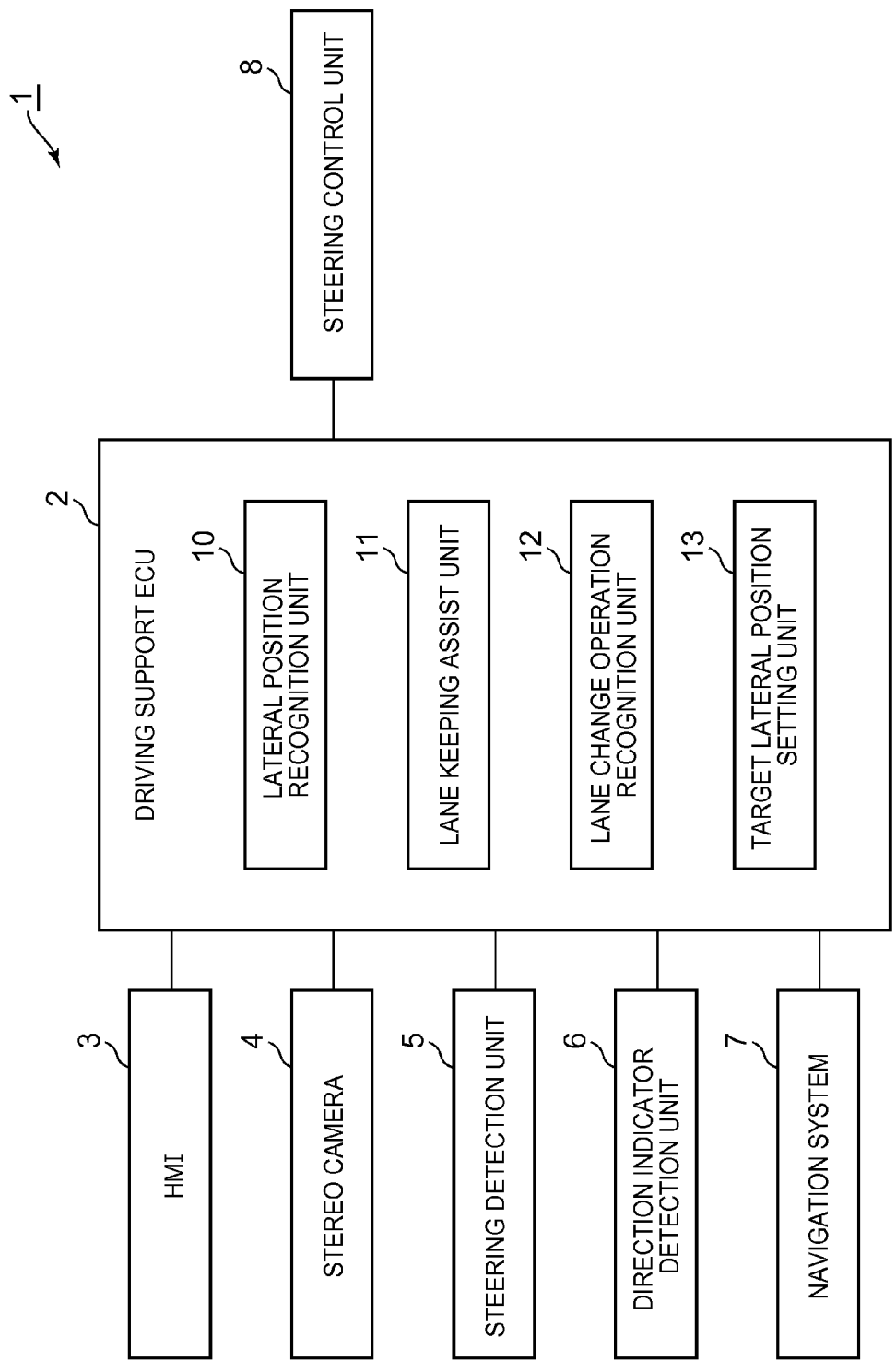
FIG. 1 is a block diagram showing a driving support apparatus according to a first embodiment.

FIG. 1 is a block diagram showing a driving support apparatus 1 according to a first embodiment. The driving support apparatus 1 shown in FIG. 1, which is mounted, for example, on a vehicle such as a passenger car, supports the driving of the vehicle by a driver. The driving support apparatus 1 performs a lane keeping assist (LKA: Lane Keeping Assist), as the driving support.

The lane keeping assist according to the embodiment is a driving support that controls the vehicle such that the lateral position of the vehicle is a target lateral position in a running lane and that reflects the steering by the driver of the vehicle in the running of the vehicle. The running lane is a lane along which the vehicle is running. The lateral position of the vehicle is the position of the vehicle in a width direction of the running lane. For example, the lateral position of the vehicle is recognized on the basis of the position of the center of the vehicle in planar view. Hereinafter, the width direction of the running lane is referred to as the lane width direction. The target lateral position is a target position to which the vehicle is guided by the lane keeping assist. For example, the target lateral position is set to the central position of the running lane in the lane width direction. Further, the target lateral position may be set to a position that is offset in the lane width direction from the central position of the running lane.

The driving support apparatus 1 recognizes two white lines (for example, lane lines or vehicular lane lines) forming the running lane, for example, by an in-vehicle camera, and adopts a position equidistant from the two white lanes in the lane width direction, as the central position of the running lane, to set the position as the target lateral position for the lane keeping assist. Further, the driving support apparatus 1 recognizes the lateral position of the vehicle, for example, from the positions of the two white lines in an image picked up by the in-vehicle camera. The driving support apparatus 1 gives steering torque to the vehicle such that the lateral position of the vehicle is the target lateral position, and thereby supports the running of the vehicle along the running lane. The driving support apparatus 1 gives the steering torque to a steering apparatus of the vehicle, for example, by controlling a steering actuator of the vehicle.

Further, the driving support apparatus 1 recognizes a lane change operation by which the driver performs the lane change of the vehicle from the running lane to an adjacent lane. The adjacent lane is a lane that is adjacent to the running lane across the lane line. The lane change operation, for example, is an operation to light a direction indicator of the vehicle for the lane change. The driving support apparatus 1, for example, recognizes the operation to light the direction indicator, as the lane change operation. Specifically, the driving support apparatus 1 may recognize the switching of a direction indicator operation unit (for example, a direction indicator lever) of the vehicle from an OFF state to an ON state by the driver, as the lane change operation. Further, the driving support apparatus 1 may recognize an operation to light the direction indicator by the recognition of a previously set driver voice for lane change start, as the lane change operation. In this case, for example, the driving support apparatus 1 includes a voice recognition apparatus that recognizes the content of voice of the driver, and a direction indicator in a direction corresponding to the voice content of the driver is lighted. Further, the driving support apparatus 1 may recognize an operation to light the direction indicator by the recognition of a previously set driver gesture for the lane change start, as the lane change operation. In this case, for example, the driving support apparatus 1 includes a driver monitoring camera that images the driver, and a direction indicator in a direction corresponding to the gesture of the driver is lighted. Alternatively, when a dedicated switch for the lane change is provided in the vehicle separately from the direction indicator operation unit, the driving support apparatus 1 may recognize the operation of the switch by the driver, as the lane change operation.

When it is determined that another operation is the operation to light the direction indicator for the lane change, the driving support apparatus 1 may recognize the operation as the lane change operation. For example, the driving support apparatus 1 recognizes the presence of an adjacent lane adjacent to the running lane along which the vehicle is running, based on map information or the detection result of an in-vehicle sensor (a camera, a laser radar or the like). In this case, the driving support apparatus 1 may be configured such that the operation to light the direction indicator at a side of the vehicle at which the adjacent lane is located is recognized as the lane change operation and the operation to light the direction indicator at a side of the vehicle at which the adjacent lane is located is not recognized as the lane change operation. When the lane keeping assist is not executed, the driving support apparatus 1 does not need to recognize the lane change operation.

During the execution of the lane keeping assist, the driving support apparatus 1 determines whether the steering torque of the steering in the lane change direction by the driver has changed from a lane change waiting threshold or more to less than the lane change waiting threshold, after the lane change operation by the driver is recognized and before a lane change operation termination condition is met. Here, for the sake of the determination, for example, for the purpose of the prevention of hunting, the lane change waiting threshold may have a hysteresis.

The lane change operation termination condition, for example, is a condition that is met when the lane change operation is terminated by the cancel of the lighting of the direction indicator or the like. The driving support apparatus 1 determines that the lane change operation termination condition has been met, for example, when the driver has switched the direction indicator lever from the ON state to the OFF state. Further, the driving support apparatus 1 may determine that the lane change operation termination condition has been met, when recognizing a voice or gesture for lane change cancel by the driver. Furthermore, the driving support apparatus 1 may determine that the lane change operation termination condition has been met, when the lateral position of the vehicle has reached a white line (lane line) that is the boundary between the running lane and the adjacent lane. Here, the period after the lane change operation by the driver is recognized and before the lane change operation termination condition is met corresponds to a period during which the direction indicator in the lane change direction is lighted, as an example.

The lane change direction is a direction that is a lane width direction and in which the vehicle goes from the running lane toward the adjacent lane for the lane change. For example, the lane change direction corresponds to a direction that is a lane width direction and that is the direction of the direction indicator lighted by the above-described lane change operation.

The lane change waiting threshold (predetermined threshold) is a threshold that is a basis of whether the driver has got to a state of temporary waiting in the lane change by weakening the steering torque in the lane change direction. The state of the temporary waiting in the lane change, for example, is a state in which, after the vehicle is pulled over to the adjacent lane, the steering torque is weakened and the moving speed of the vehicle in the vehicle width direction is decreased for the check of the traffic on the adjacent lane as the lane change destination with a side mirror or the like. The lane change waiting threshold, for example, may be an arbitrary value of 0.01 Nm or more and less than 5.00 Nm. The lane change waiting threshold may be a fixed value, or may be values to vary depending on the speed or acceleration of the vehicle. The lane change waiting threshold may be values to vary depending on the speed of a vehicle M in the lane width direction or the acceleration of the vehicle M in the lane width direction.

During the execution of the lane keeping assist, after the lane change operation by the driver is recognized and before it is determined that the previously set lane change operation termination condition has been met, when it is determined that the steering torque of the steering in the lane change direction by the driver has changed from the lane change waiting threshold or more to less than the lane change waiting threshold, the driving support apparatus 1 sets the lateral position of the vehicle at the time of the determination, as the target lateral position. The driving support apparatus 1 sets a new target lateral position in the running lane. The time of the determination includes not only the time point of the determination but also a time including the time point of the determination and having a predetermined range. The predetermined range, for example, is a range of accepting a time lag between the determination processing and the recognition processing for the lateral position of the vehicle in the driving support apparatus 1. The time having the predetermined range may be a length of approximately several seconds (for example, five seconds or less).

Here, when the new target lateral position is set, the driving support apparatus 1 cancels the previous target lateral position. In addition, when the lane keeping assist is not executed, the driving support apparatus 1 does not perform the setting of the target lateral position described above. Further, even during the execution of the lane keeping assist, the driving support apparatus 1 does not perform the setting of the target lateral position described above, other than after the lane change operation by the driver is recognized and before the lane change operation termination condition is met.

Figure 2:
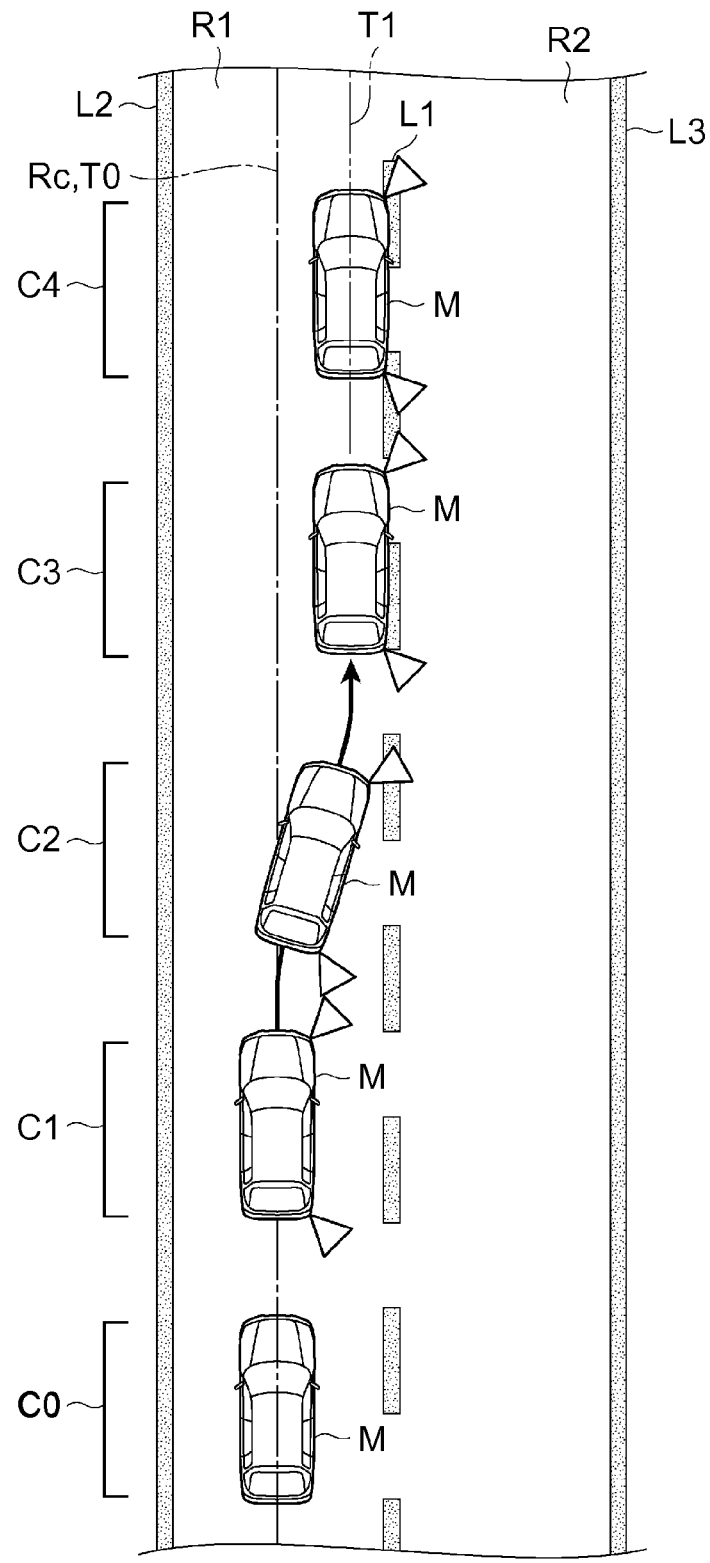
FIG. 2 is a plan view for describing the setting of a target lateral position for a lane keeping assist at the time of a lane change.

Here, FIG. 2 is a plan view for describing the setting of the target lateral position for the lane keeping assist at the time of the lane change. Reference character M shown in FIG. 2 denotes a vehicle that is equipped with the driving support apparatus 1. Reference character R1 denotes a running lane along which the vehicle M runs. Reference character R2 denotes an adjacent lane that is adjacent to the running lane R1. Reference character L1 denotes a white line (lane line) that is a boundary between the running lane R1 and the adjacent lane R2. Reference character L2 denotes a white line (vehicular lane line) of the running lane R1 on the opposite side of the lane line L1. Reference character L3 denotes a white line (central line) of the adjacent lane R2 on the opposite side of the lane line L1. Reference character Rc denotes a virtual line showing the central position of the running lane R1 in the lane width direction. Reference character T0 denotes an initial target lateral position in the lane keeping assist. The initial target lateral position, for example, is a target lateral position that is automatically set corresponding to the running lane R1 at the time of the start of the lane keeping assist. Here, the initial target lateral position T0 coincides with the central position Rc of the running lane R1. Reference character T1 denotes a target lateral position that is newly set in response to the temporary waiting while the vehicle is in a process of the lane change by an operation of the driver.

In FIG. 2, reference characters C0 to C4 denote situation transitions after the vehicle M during the execution of the lane keeping assist starts the lane change and before the state of the temporary waiting in the lane change. Reference character C0 denotes a situation in which the driver runs the vehicle M while receiving the lane keeping assist corresponding to the initial target lateral position T0. In the situation of C0, the driving support apparatus 1 performs the lane keeping assist such that the lateral position of the vehicle M is the initial target lateral position T0. Reference character C1 denotes a situation in which the driver performs the lane change operation for the lane change from the running lane R1 to the adjacent lane R2 and lights the direction indicators on the adjacent lane side. In the situation of C1, the driving support apparatus 1 recognizes the lane change operation by the driver.

Reference character C2 denotes a situation in which the driver moves the vehicle M in the direction (lane change direction) from the target lateral position T0 toward the adjacent lane R2. In the situation of C2, the driving support apparatus 1 gives steering torque to the vehicle M by the lane keeping assist, for returning the lateral position of the vehicle M to the target lateral position T0. Here, the driving support apparatus 1 may lessen the gain of the steering torque to be given to the vehicle M at the time of the lane change, relative to the ordinary time.

Reference character C3 denotes a situation in which the driver performs the temporary waiting in the lane change. In the situation of C3, the driver weakens the steering torque of the steering in the lane change direction so that the steering torque changes from the lane change waiting threshold or more to less than the lane change waiting threshold. The driving support apparatus 1 sets, as the new target lateral position T1, the lateral position of the vehicle M when it is determined that the steering torque of the steering in the lane change direction by the driver has changed from the lane change waiting threshold or more to less than the lane change waiting threshold.

Reference character C4 denotes a situation in which the driver continues the temporary waiting in the lane change. In the situation of C4, the driving support apparatus 1 performs the lane keeping assist such that the lateral position of the vehicle M is the target lateral position T1. That is, the driving support apparatus 1 performs the control so as to keep the new target lateral position T1 as the lateral position of the vehicle M, without giving the steering torque for returning the lateral position of the vehicle M to the initial target lateral position T0. Thereby, when the driver performs the temporary waiting in the middle of the lane change during the execution of the lane keeping assist, the driving support apparatus 1 does not give the steering torque by the lane keeping assist for returning the vehicle to the initial target lateral position T0 (the central position Rc of the running lane), resulting in the avoidance of a circumstance in which the driver keeps the vehicle M while resisting the steering torque. Therefore, it is possible to inhibit the driver from feeling uncomfortable.

Here, for example, when the lane change operation termination condition is met by the cancel of the lighting state of the direction indicators after the target lateral position T1 is set, the driving support apparatus 1 returns the target lateral position for the lane keeping assist to the initial target lateral position T0. Further, when the lateral position of the vehicle M reaches the white line L1 and thereby the lane change operation termination condition is met, it can be regarded that the lane keeping assist for the running lane R1 becomes unnecessary, and therefore, the driving support apparatus 1 may terminate the lane keeping assist itself. Alternatively, when it is determined that the lane change of the vehicle M from the running lane R1 to the adjacent lane R2 is completed based on the detection result of the in-vehicle sensor, the driving support apparatus 1 may transition to the lane keeping assist for the adjacent lane R2. The lane keeping assist for the adjacent lane R2, for example, is a lane keeping assist in which the central position Rc in the lane width direction of the adjacent lane R2 is adopted as the target lateral position. In addition, when the driver cancels the lane keeping assist after the target lateral position T1 is set, the driving support apparatus 1 cancels the setting of the target lateral position T1 also. Further, when the lane change operation is canceled, for example, by the switching of the direction indicator lever to the OFF state before the lane change of the vehicle M from the running lane R1 to the adjacent lane R2 is completed, the driving support apparatus 1 may perform the lane keeping assist for either of the running lane R1 and the adjacent lane R2, if the lane keeping assist is not canceled. In this case, the driving support apparatus 1, for example, may perform the lane keeping assist for the running lane R1 if the center position of the vehicle M does not exceed the white line L1, and may perform the lane keeping assist for the adjacent lane R2 if the center position of the vehicle M exceeds the white line L1.

In the following, a configuration of the driving support apparatus 1 according to the first embodiment will be described with reference to the drawings. As shown in FIG. 1, the driving support apparatus 1 includes a driving support ECU [Electronic Control Unit] 2 that performs the control relevant to the driving support. The driving support ECU 2 is an electronic control unit including a CPU [Central Processing Unit], a ROM [Read Only Memory], a RAM [Random Access Memory], and the like. The driving support ECU 2, in which a program stored in the ROM is loaded in the RAM and executed by the CPU, executes various driving support controls. The driving support ECU 2 may be constituted by multiple electronic control units. The driving support ECU 2 is connected with an HMI [Human Machine Interface] 3, a stereo camera 4, a steering detection unit 5, a direction indicator detection unit 6, a navigation system 7, and a steering control unit 8.

The HMI 3 is an interface for performing the output and input of information between the driver and the driving support apparatus 1. The HMI 3, for example, includes a display panel for displaying image information to the driver and the like, a speaker for voice output, an operation button or a touch panel through which the driver performs an input operation, and the like. The HMI 3 includes a LKA switch through which the driver inputs the start and termination of the lane keeping assist. The HMI 3 may include a voice recognition unit for recognizing the voice of the driver. Further, the HMI 3 may include a gesture recognition unit for recognizing the gesture of the driver, and may be connected with the driver monitoring camera. The HMI 3 outputs the information input by the driver, to the driving support ECU 2. Further, the HMI 3 performs the image display to the display and the voice output from the speaker, in response to control signals from the driving support ECU 2. As the HMI 3, a portable information terminal wirelessly connected with the driving support apparatus 1 may be utilized.

The stereo camera 4, for example, includes two imaging units that are provided on the back surface of a windshield of the vehicle M. The two imaging units are disposed so as to be arrayed in the vehicle width direction of the vehicle M, and images a forward sight of the own vehicle. The stereo camera 4 sends the imaging information about the forward sight of the vehicle M, to the driving support ECU 2. Here, instead of the stereo camera 4, a monocular camera may be used.

The steering detection unit 5 detects the steering torque by the driver and the direction of the steering. The steering detection unit 5, which is provided, for example, to a steering shaft of the vehicle M, detects the steering torque to be given to a steering wheel by the driver, and the direction of the steering. The steering detection unit 5 sends the steering information relevant to the steering by the driver, to the driving support ECU 2.

The direction indicator detection unit 6 detects the operation of the direction indicator operation unit of the vehicle M by the driver. The direction indicator detection unit 6 is provided, for example, on the root of the direction indicator lever that is the direction indicator operation unit, and detects the switching of the direction indicator lever (the switching among the OFF state, the right-direction-indicator lighting state and the left-direction-indicator lighting state). The direction indicator detection unit 6 sends the operation information about the direction indicator operation unit, to the driving support ECU 2.

The navigation system 7 guides the driver of the vehicle M, to a destination set by the driver. The navigation system 7, for example, includes a GPS receiving unit for measuring the position of the vehicle M, and a map database in which the map information is stored. The GPS receiving unit, for example, receives signals from three or more GPS satellites, and thereby, measures the position (for example, the latitude and the longitude) of the vehicle M. The map information of the map database, for example, includes the position of roads, the type of roads, the position of intersections or crossroads, and the like. The navigation system 7 recognizes a running road along which the vehicle M runs, based on the position of the vehicle M measured by the GPS receiving unit and the map information of the map database. The navigation system 7, for example, sends the position information about the vehicle M, the information about the running road of the vehicle M, and the guide route information about the vehicle M, to the driving support ECU 2. Here, the driving support apparatus 1 does not always need to include the navigation system 7.

The steering control unit 8 is an electronic control unit that controls an electric power steering system [EPS: Electric Power Steering] of the vehicle M. The steering control unit 8 drives a steering actuator that is of the electric power steering system and that controls the steering torque of the vehicle M, and thereby, controls the steering torque of the vehicle M. The steering control unit 8 controls the steering torque, corresponding to the control signal from the driving support ECU 2.

Next, a functional configuration of the driving support ECU 2 will be described. The driving support ECU 2 includes a lateral position recognition unit 10, a lane keeping assist unit 11, a lane change operation recognition unit 12, and target lateral position setting unit 13. Here, some of the functions of the driving support ECU 2 described below may be executed in a computer or portable information terminal in a facility such as an information management center capable of communicating with the vehicle M.

The lateral position recognition unit 10 recognizes the lateral position of the vehicle M. The lateral position recognition unit 10, for example, recognizes the white lines L1, L2 of the running lane R1 by image analysis, based on the image of the forward sight of the vehicle M that is imaged by the stereo camera 4. The lateral position recognition unit 10, for example, recognizes the lateral position of the vehicle M in the running lane R1, based on the position of the recognized white lines L1, L2 in the image.

The lane keeping assist unit 11 performs the lane keeping assist for the vehicle M. The lane keeping assist unit 11 starts the lane keeping assist, for example, when the driver operates the LKA switch of the HMI 3. The lane keeping assist unit 11 sets the target lateral position T0 previously set for the running lane R1. The previously set target lateral position T0 may be the central position Rc of the running lane R1 in the lane width direction, or may be a position that is offset from the central position Rc to the left or right side by a previously set distance. The lane keeping assist unit 11 gives the steering torque to the vehicle M such that the lateral position of the vehicle M recognized by the lateral position recognition unit 10 is the target lateral position T0, and thereby, controls the running of the vehicle M. The lane keeping assist unit 11 sends a control signal to the steering control unit 8, and thereby, gives the steering torque to the vehicle M.

Here, in order not to excessively prevent the steering of the driver, the lane keeping assist unit 11, at the time of the lane change, may lessen the gain of the steering torque to be given to the vehicle M, relative to the ordinary time. The detail will be described later.

The lane change operation recognition unit 12 recognizes the lane change operation by the driver. The lane change operation recognition unit 12, for example, recognizes the switching of the direction indicator lever to the ON state by the driver, as the lane change operation, based on the operation information of the direction indicator detection unit 6. The lane change operation recognition unit 12 may recognize the previously set voice or gesture of the driver, as the lane change operation. Further, the lane change operation recognition unit 12 may be configured such that, when it is determined that the running road along which the vehicle M runs is a one-lane road based on the position information about the vehicle M and the map information from the navigation system 7, the switching of the direction indicator lever to the ON state is not recognized as the lane change operation because the lane change cannot be performed. Further, the lane change operation recognition unit 12 may recognize a side of the vehicle at which the adjacent lane R2 is located, based on a variety of information of the navigation system 7 and the imaging information of the stereo camera 4, and may recognize only the operation to light the direction indicator mounted at a side of the vehicle at which the adjacent lane R2 is located, as the lane change operation.

During the execution of the lane keeping assist, after the lane change operation recognition unit 12 recognizes the lane change operation by the driver and before it is determined that the lane change operation termination condition has been met, when it is determined that the steering torque of the steering in the lane change direction by the driver has changed from the lane change waiting threshold or more to less than the lane change waiting threshold, the target lateral position setting unit 13 sets the lateral position of the vehicle M at the time of the determination, as the new target lateral position T1.

That is, when the lane change operation recognition unit 12 recognizes the lane change operation by the driver during the execution of the lane keeping assist by the lane keeping assist unit 11, the target lateral position setting unit 13 determines whether the lane change operation termination condition has been met. The target lateral position setting unit 13, for example, determines that the lane change operation termination condition has been met, when the operation to cancel the lighting of the direction indicator (for example, the switching of the direction indicator lever to the OFF state) is recognized based on the input information of the HMI 3 or the operation information of the direction indicator detection unit 6. Further, the target lateral position setting unit 13 may determine that the vehicle change operation termination condition has been met, when it is determined that the lateral position of the vehicle M has reached the white line L1, which is the boundary between the running lane R1 and the adjacent lane R2, based on the recognition result of the lateral position recognition unit 10 and the imaging information of the stereo camera 4.

The target lateral position setting unit 13 determines whether the steering torque of the steering in the lane change direction by the driver has changed from the lane change waiting threshold or more to less than the lane change waiting threshold, based on the steering information of the steering detection unit 5, during the execution of the lane keeping assist, after the lane change operation recognition unit 12 recognizes the lane change operation by the driver and before it is determined that the lane change operation termination condition has been met. When it is determined that the steering torque of the steering in the lane change direction by the driver has changed from the lane change waiting threshold or more to less than the lane change waiting threshold, the target lateral position setting unit 13 sets the lateral position of the vehicle M recognized at the time of the determination by the lateral position recognition unit 10, as the new target lateral position T1 for the lane keeping assist. Here, the target lateral position setting unit 13, for example, sets a new target lateral position whenever the determination for the steering torque described above is made. In this case, the previous target lateral position is canceled.

When it is determined that the lane change operation termination condition has been met, for example, by the switching of the direction indicator lever to the OFF state after the new target lateral position T1 is set, the target lateral position setting unit 13 performs a process to restore the target lateral position to normal. As the process to restore the target lateral position to normal, the target lateral position setting unit 13 cancels the new target lateral position T1, and restores the initial target lateral position T0. When the lateral position of the vehicle M reaches the white line L1 so that the lane change operation termination condition is met, the target lateral position setting unit 13 may terminate the lane keeping assist.

Figure 3:
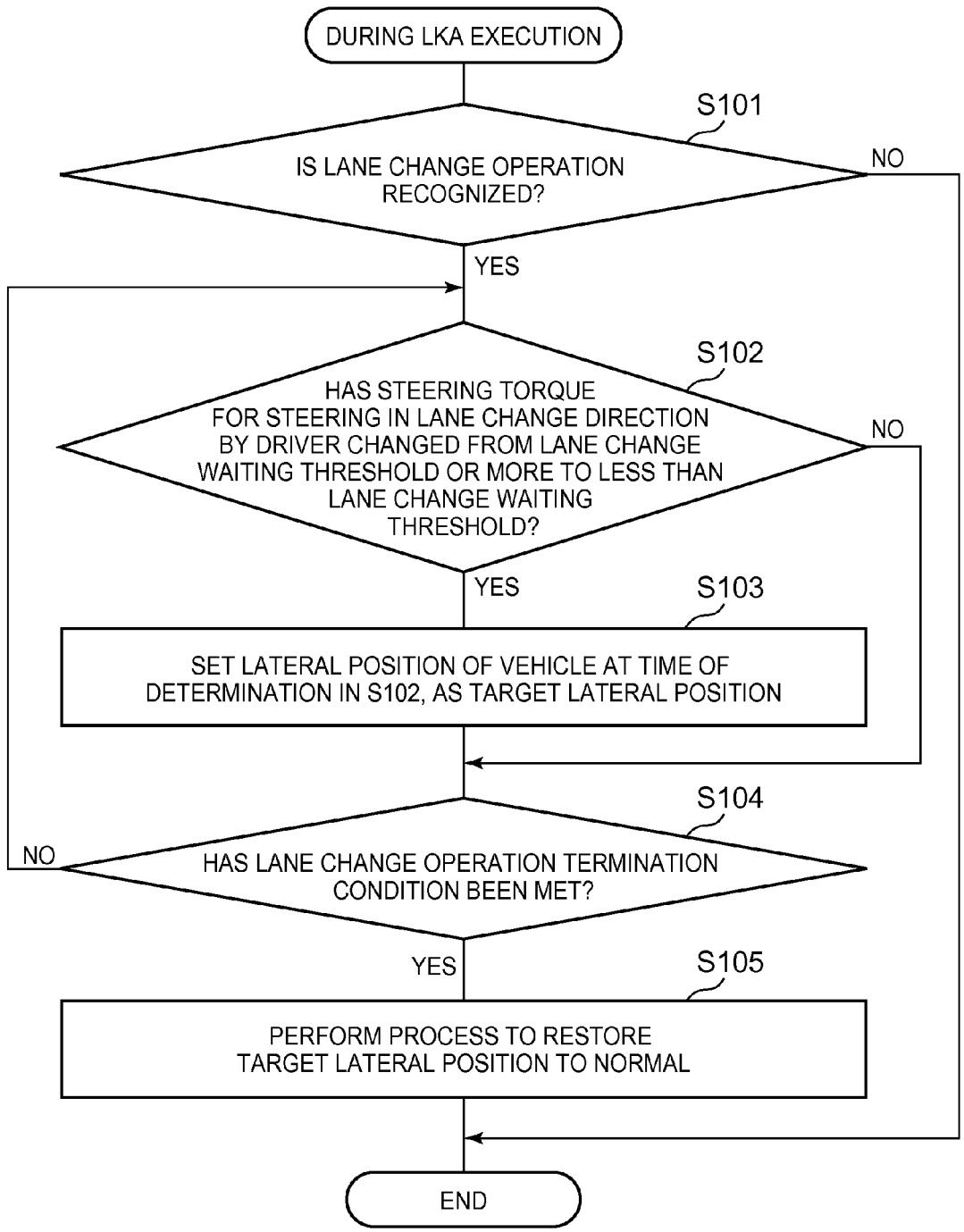
FIG. 3 is a flowchart showing a driving support method of the driving support apparatus according to the first embodiment.

Next, a driving support method of the driving support apparatus 1 according to the first Embodiment will be described with reference to the drawings. FIG. 3 is a flowchart showing a driving support method of the driving support apparatus 1 according to the first embodiment. The flowchart shown in FIG. 3 is repeatedly executed during the execution of the lane keeping assist, for example. Further, when the driver terminates the lane keeping assist, the process of the flowchart shown in FIG. 3 is terminated.

As shown in FIG. 3, in step S101, the driving support ECU 2 of the driving support apparatus 1 performs the recognition of the lane change operation by the driver with the lane change operation recognition unit 12. When the lane change operation by the driver is not recognized (S101: NO), the driving support ECU 2 terminates the control process this time. Thereafter, the control process is repeated from step S101 again.

On the other hand, when the lane change operation by the driver is recognized (S101: YES), the driving support ECU 2 transitions to step S102. On this occasion, for example, when the steering by the driver is in the lane change direction, the lane keeping assist unit 11 of the driving support ECU 2 lessens the gain of the steering torque for returning the vehicle M to the target lateral position, relative to the ordinary time. Thereby, the driving support apparatus 1 makes it possible to reduce the strength necessary for the driver changing the lane to resist the steering torque by the lane keeping assist. Further, in the lane keeping assist unit 11, when the steering by the driver is not in the lane change direction, the gain of the steering torque may be the same as the ordinary time, or may be greater than the ordinary time.

In step S102, the target lateral position setting unit 13 of the driving support ECU 2 determines whether the steering torque of the steering in the lane change direction by the driver has changed from the lane change waiting threshold or more to less than the lane change waiting threshold, based on the steering information of the steering detection unit 5. When it is determined that the steering torque of the steering in the lane change direction by the driver has not changed from the lane change waiting threshold or more to less than the lane change waiting threshold (S102: NO), the target lateral position setting unit 13 transitions to step S104.

On the other hand, when it is determined that the steering torque of the steering in the lane change direction by the driver has changed from the lane change waiting threshold or more to less than the lane change waiting threshold (S102: YES), the target lateral position setting unit 13 transitions to step S103. In step S103, the target lateral position setting unit 13 sets the lateral position of the vehicle M at the time of the determination of YES in step S102, as the target lateral position T1. On this occasion, in the case of having changed the gain of the steering torque after step S101, the lane keeping assist unit 11 restores the gain of the steering torque to the level at the ordinary time. The lane keeping assist unit 11 performs the lane keeping assist such that the lateral position of the vehicle M is the new target lateral position T1.

In step S104, the target lateral position setting unit 13 determines whether the lane change operation termination condition has been met, for example, based on the input information of the HMI 3 or the operation information of the direction indicator detection unit 6. For example, when the operation to cancel the lighting of the direction indicator by the driver is recognized, the target lateral position setting unit 13 determines that the lane change operation termination condition has been met. When it is determined that the lane change operation termination condition has not been met (S104: NO), the target lateral position setting unit 13 returns to step S102 and repeats the process. When it is determined that the lane change operation termination condition has been met (S104: YES), the target lateral position setting unit 13 transitions to step S105.

In step S105, the target lateral position setting unit 13 performs the process to restore the target lateral position to normal. As the process to restore the target lateral position to normal, the target lateral position setting unit 13 cancels the new target lateral position T1 set in step S103, and restores the initial target lateral position T0. Here, when the new target lateral position T1 has not been set, the target lateral position setting unit 13 does not perform a special process, as the process to restore the target lateral position to normal. It is not always necessary to perform the process to restore the target lateral position to normal. Here, when the gain of the steering torque has been changed after the step S101 and the gain has not yet been restored to the level at the ordinary time, the lane keeping assist unit 11 restores the gain of the steering torque to the level at the ordinary time in the process to restore the target lateral position to normal.

After step S105, the driving support ECU 2 terminates the process. When the lane keeping assist is continued even after the elapse of a previously set time, the driving support ECU 2 repeats the process from step S101.

Next, function effects of a driving support apparatus according to the first Embodiment will be described. In the driving support apparatus 1 according to the first embodiment described above, during the execution of the lane keeping assist, after the lane change operation by the driver is recognized and before it is determined that the lane change operation termination condition has been met, when it is determined that the steering torque of the steering in the lane change direction which is given by the driver has changed from the lane change waiting threshold or more to less than the lane change waiting threshold, the lateral position of the vehicle M at the time of the determination is set as the target lateral position T1 for the lane keeping assist. Therefore, in the driving support apparatus 1, for example, even when the driver temporarily waits in the lane change and weakens the steering torque to less than the lane change waiting threshold for seeing the appearance of the adjacent lane R2 in the middle of the lane change, since the lateral position of the vehicle when the steering torque by the driver becomes less than the lane change waiting threshold is set as the target lateral position T1 for the lane keeping assist, it is possible to avoid giving, to the vehicle M, the steering torque by the lane keeping assist for returning the vehicle to the initial target lateral position T0, and it is possible to inhibit the driver from feeling uncomfortable.

Furthermore, according to the driving support apparatus 1, the lateral position of the vehicle M at the time of the temporary waiting in the lane change is kept by the lane keeping assist. Therefore, it is possible to reduce the load of the steering by the driver during the temporary waiting, and it is possible to give security feeling to the driver because the lane keeping assist is executed.

Next, a driving support apparatus 21 according to a second embodiment will be described. In the driving support apparatus 21 according to the second embodiment, a function to start the lane change assist under a previously set condition during the execution of the lane keeping assist is added to the first embodiment. Here, for constituents identical or corresponding to the constituents of the first embodiment, the same reference characters are assigned, and repetitive descriptions are omitted.

Figure 4:
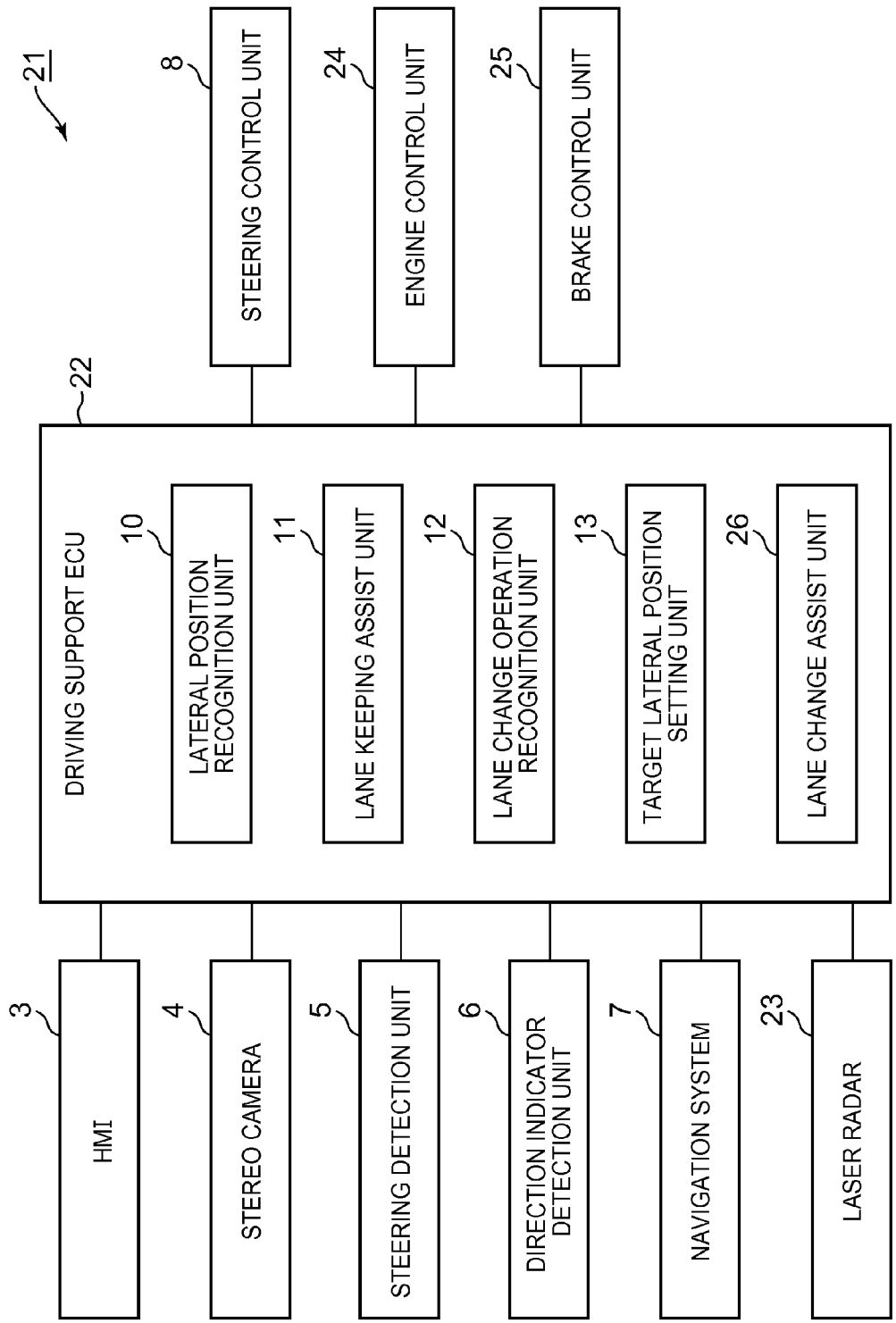
FIG. 4 is a block diagram showing a driving support apparatus according to a second embodiment.

FIG. 4 is a block diagram showing the driving support apparatus 21 according to the second embodiment. During the execution of the lane keeping assist, after the lane change operation by the driver is recognized and before it is determined that the lane change operation termination condition has been met, when the lateral position of the vehicle M has reached a previously set lane change assist starting lateral position, the driving support apparatus 21 shown in FIG. 4 terminates the lane keeping assist and starts the lane change assist. The lane change assist starting lateral position is a position in the lane width direction that is a basis of the start of the lane change assist. The lane change assist starting lateral position is set in the running lane R1 or on the white line L1. A specific example of the lane change assist starting lateral position will be described later. Here, the driving support apparatus 21 does not need to perform the termination of the lane keeping assist and the start of the lane change assist simultaneously. There may be a time lag between the termination of the lane keeping assist and the start of the lane change assist, and the lane keeping assist and the lane change assist may overlap partially.

The lane change assist is a driving support that supports the lane change of the vehicle M by the driver. The lane change assist, for example, is a support that controls the steering and speed of the vehicle M such that the vehicle M runs along a target route from the current position toward the adjacent lane R2. The target route, for example, is obtained by a widely-known technique. For example, even during the execution of the lane change assist, the driving support apparatus 21 reflects the steering, accelerator operation and brake operation by the driver in the running of the vehicle M.

Figure 5:
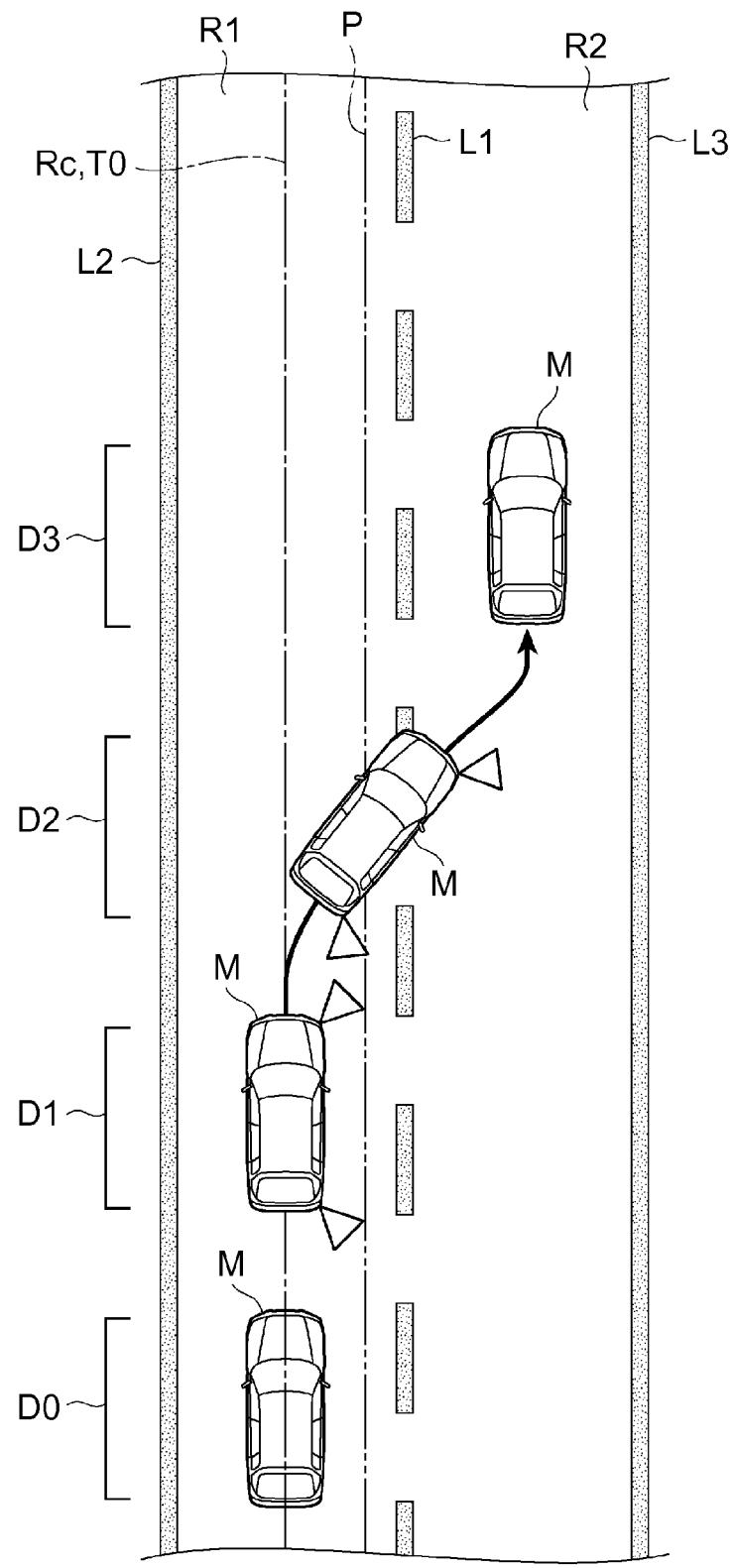
FIG. 5 is a plan view for describing the start of a lane change assist.

Here, FIG. 5 is a plan view for describing the start of the lane change assist. Reference character P shown in FIG. 5 denotes a lane change assist starting lateral position. In FIG. 5, reference characters D0 to D3 denote situation transitions after the vehicle M during the execution of the lane keeping assist starts the lane change and before the lane change assist is started and the lane change is completed.

Reference character D0 denotes a situation in which the driver runs the vehicle M while receiving the lane keeping assist corresponding to the initial target lateral position T0. Reference character D1 denotes a situation in which the driver performs the lane change operation and lights the direction indicators on the adjacent lane side. In the situation of D1, the driving support apparatus 21 recognizes the lane change operation by the driver.

Reference character D2 denotes a situation in which the driver moves the vehicle M in the direction (lane change direction) from the target lateral position T0 toward the adjacent lane R2 and the lateral position of the vehicle M reaches the lane change assist starting lateral position P. In the situation of D2, the driving support apparatus 21 terminates the lane keeping assist, and starts the lane change assist. As the lane change assist, for example, the driving support apparatus 21 controls the vehicle M such that the lateral position of the vehicle M reaches the central position of the adjacent lane R2.

Here, when the steering torque of the steering in the lane change direction by the driver has changed from the lane change waiting threshold or more to less than the lane change waiting threshold before the lateral position of the vehicle M reaches the lane change assist starting lateral position P, the driving support apparatus 21 sets the lateral position of the vehicle M at the time of the determination, as the target lateral position T1.

Reference character D3 denotes a situation in which the lane change of the vehicle M from the running lane R1 to the adjacent lane R2 is completed. In the situation of D3, the driving support apparatus 21 terminates the lane change assist. The driving support apparatus 21 may start the lane keeping assist for the adjacent lane R2, with the termination of the lane change assist.

Figure 6A:
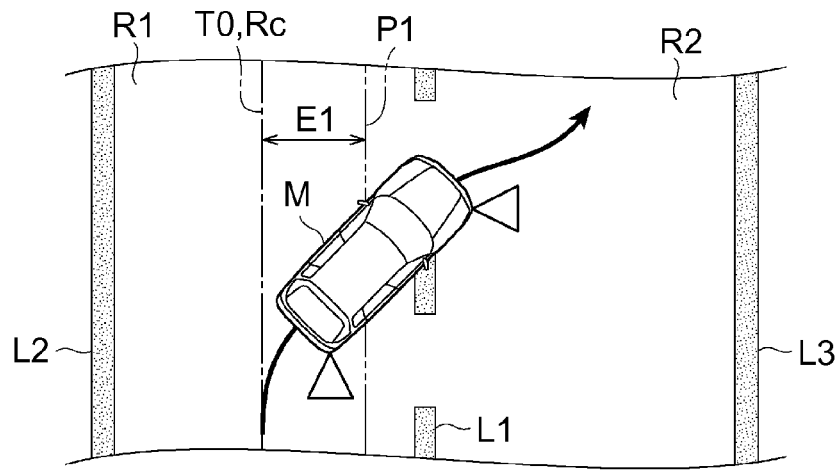
FIG. 6A is a plan view for describing a lane change assist starting lateral position on the basis of a central position of a running lane.

Subsequently, examples of the lane change assist starting lateral position P will be described with reference to FIGS. 6A, 6B and 6C. FIG. 6A is a plan view for describing a lane change assist starting lateral position P1 on the basis of the central position Rc of the running lane R1. Reference character P1 shown in FIG. 6A denotes a lane change assist starting lateral position. Reference character E1 denotes a first distance described later.

As shown in FIG. 6A, the driving support apparatus 21, for example, sets the lane change assist starting lateral position P1 on the basis of the central position Rc of the running lane R1. Specifically, the driving support apparatus 21 sets, as the lane change assist starting lateral position P1, a position at the previously set first distance E1 from the central position Rc of the running lane R1 toward the lane change direction. In this case, when the lateral position of the vehicle M has reached the position at the first distance E1 from the central position Rc of the running lane R1 toward the lane change direction, the driving support apparatus 21 determines that the lateral position of the vehicle M has reached the lane change assist starting lateral position P1, and performs the termination of the lane keeping assist and the start of the lane change assist.

The first distance E1 may be, for example, an arbitrary value in a range from 0.1 m or more to less than half the lane width. As the lane width, the lane width of the running lane R1 acquired from the map information and the like may be used, or a fixed value (for example, 4 m) may be used. Further, the first distance E1 may be a fixed value, or may be values to vary depending on the speed of the vehicle M, the acceleration of the vehicle M or the like. The first distance E1 may be values to vary depending on the speed of the vehicle M in the lane width direction or the acceleration of the vehicle M in the lane width direction. In order to avoid exceeding the white line L1 that is the boundary between the running lane R1 and the adjacent lane R2, the first distance E1 may be values to vary depending on the width of the running lane R1 along which the vehicle runs, the running section of the road on which the vehicle runs, the road type (for example, a freeway or a general road) or the like.

Figure 6B:
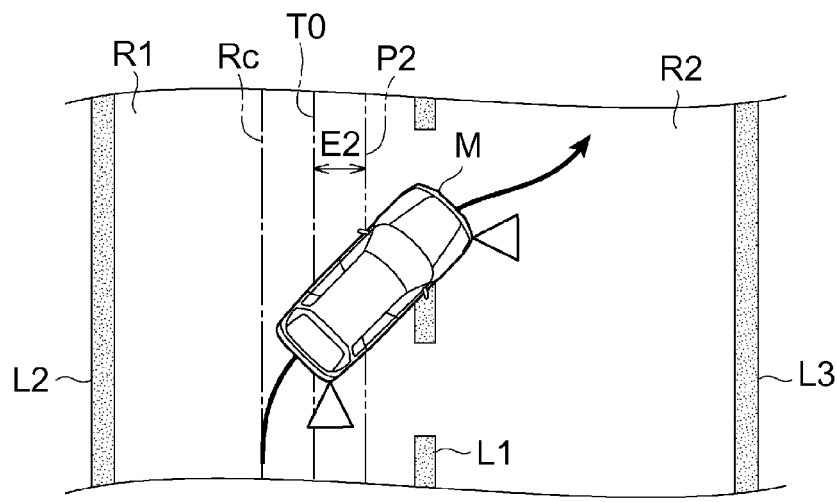
FIG. 6B is a plan view for describing a lane change assist starting lateral position on the basis of a target lateral position.

FIG. 6B is a plan view for describing a lane change assist starting lateral position P2 on a basis of the target lateral position T0. Reference character P2 shown in FIG. 6B is a lane change assist starting lateral position. Reference character E2 denotes a second distance described later. In FIG. 6B, the target lateral position T0 is set to a position that is offset from the central position Rc of the running lane R1. Here, the target lateral position T0 shown in FIG. 6B may be positioned not on the side of the adjacent lane R2 but on the opposite side of the adjacent lane R2, with respect to the central position Rc of the running lane R1, or may coincide with the central position Rc of the running lane R1.

As shown in FIG. 6B, the driving support apparatus 21 may set the lane change assist starting lateral position P2 on the basis of the target lateral position T0. Specifically, the driving support apparatus 21 sets, as the lane change assist starting lateral position P2, a position at the previously set second distance E2 from the target lateral position T0 toward lane change direction. In this case, when the lateral position of the vehicle M has reached the position at the second distance E2 from the target lateral position T0 toward the lane change direction, the driving support apparatus 21 determines that the lateral position of the vehicle M has reached the lane change assist starting lateral position P2, and performs the termination of the lane keeping assist and the start of the lane change assist.

The second distance E2 may be, for example, an arbitrary value in a range from 0.1 m or more to less than the lane width. As the lane width, the lane width of the running lane R1 acquired from the map information and the like may be used, or a fixed value (for example, 4 m) may be used. Further, the second distance E2 may be a fixed value, or may be values to vary depending on the speed of the vehicle M, the acceleration of the vehicle M or the like. The second distance E2 may be values to vary depending on the speed of the vehicle in the lane width direction or the acceleration of the vehicle in the lane width direction. In order to avoid exceeding the white line L1 that is the boundary between the running lane R1 and the adjacent lane R2, the second distance E2 may be values to vary depending on the distance between the target lateral position and the white line L1, the width of the running lane R1 along which the vehicle runs, the running section of the road on which the vehicle runs, the road type (for example, a freeway or a general road) or the like. Here, when the new target lateral position T1 is set, the driving support apparatus 21 may newly set the lane change assist starting lateral position P2 on the basis of the target lateral position T1. The driving support apparatus 21 does not need to change the lane change assist starting lateral position P2, even when the new target lateral position T1 is set.

Figure 6C:
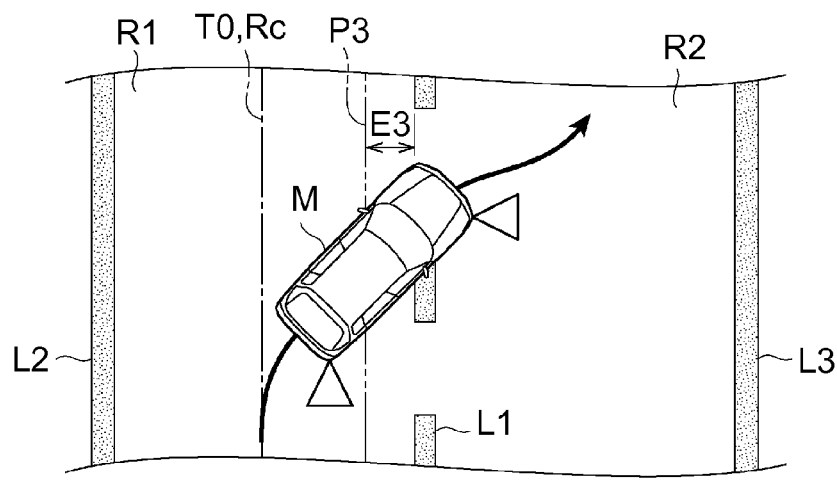
FIG. 6C is a plan view for describing a lane change assist starting lateral position on the basis of a lane line that is a boundary between the running lane and an adjacent lane.

FIG. 6C is a plan view for describing a lane change assist starting lateral position P3 on the basis of the white line L1 that is the boundary between the running lane R1 and the adjacent lane R2. Reference character P3 shown in FIG. 6C denotes a lane change assist starting lateral position. Reference character E3 denotes a third distance described later.

As shown in FIG. 6C, the driving support apparatus 21 may set the lane change assist starting lateral position P3 on the basis of the white line L1. Specifically, the driving support apparatus 21 sets, as the lane change assist starting lateral position P3, a position at the previously set third distance E3 from the white line L1 inward of the running lane R1 in the lane width direction. In this case, when the lateral position of the vehicle M has reached the position at the third distance E3 from the white line L1 inward of the running lane R1, the driving support apparatus 21 determines that the lateral position of the vehicle M has reached the lane change assist starting lateral position P3, and performs the termination of the lane keeping assist and the start of the lane change assist.

The third distance E3 may be, for example, an arbitrary value in a range from 0.1 m or more to less than half the lane width. As the lane width, the lane width of the running lane R1 acquired from the map information and the like may be used, or a fixed value (for example, 4 m) may be used. Further, the third distance E3 may be a fixed value, or may be values to vary depending on the speed of the vehicle M, the acceleration of the vehicle M or the like. The third distance E3 may be values to vary depending on the speed of the vehicle in the lane width direction or the acceleration of the vehicle in the lane width direction. The third distance E3 may be values to vary depending on the width of the running lane R1, the running section, the road type (for example, a freeway or a general road) or the like.

Here, in the case where the lane change assist starting lateral position P3 is set on the basis of the white line L1 as shown in FIG. 6C, compared to the case of FIG. 6A or the case of FIG. 6B, it is possible to avoid falsely setting the lane change assist starting lateral position P in the adjacent lane R2 beyond the white line L1, for example, when the width of the running lane is narrow. Further, the lane change assist starting lateral position P does not need to be a single position. At least two of the lane change assist starting lateral positions P1 to P3 shown in FIG. 6A to FIG. 6C may be combined and used. In addition, the driving support apparatus 21 may set the lane change assist starting lateral position P on the white line L1, and may combine and use the lane change assist starting lateral position P set on the white line L1 and the lane change assist starting lateral positions P1 to P3 shown in FIG. 6A to FIG. 6C.

A configuration of a driving support apparatus according to the second Embodiment will be described. As shown in FIG. 4, the driving support apparatus 21 according to the second embodiment includes a driving support ECU 22. The driving support ECU 22 is connected with the HMI 3, the stereo camera 4, the steering detection unit 5, the direction indicator detection unit 6, the navigation system 7, the steering control unit 8, a laser radar 23, an engine control unit 24 and a brake control unit 25. In the following, elements not overlapping with the first embodiment will be described. Here, the driving support apparatus 21 does not always need to include the navigation system 7, and does not always need to include the laser radar 23.

The laser radar 23, for example, is provided on at least one of a front end, rear end and side part of the vehicle M, and detects an obstacle around the vehicle M by utilizing laser. The laser radar 23, for example, sends laser around the vehicle M, receives the laser reflected by an obstacle such as another vehicle, and thereby, detects the obstacle. The laser radar 23 sends the detected obstacle information to the driving support ECU 2. Here, instead of the laser radar 23, a millimeter-wave radar or the like may be used.

The engine control unit 24 is an electronic control unit that controls an engine of the vehicle M. The engine control unit 24, for example, controls the fuel supply rate and air supply rate to the engine, and thereby, controls the driving force of the vehicle M. Here, in the case where the own vehicle is a hybrid vehicle or an electric vehicle, the engine control unit 24 functions as a motor control unit to control a motor that is driven as a dynamic power source. The engine control unit 24 controls the driving force of the vehicle M, in response to a control signal from the driving support ECU 2.

The brake control unit 25 is an electronic control unit that controls a brake system of the vehicle M. As the brake system, for example, a hydraulic brake system can be used. The brake control unit 25 regulates the liquid pressure to be given to the hydraulic brake system, and thereby, controls the braking force to be given to wheels of the own vehicle. The brake control unit 25 controls the braking force to the wheels, in response to a control signal from the driving support ECU 2. Here, in the case where the vehicle M includes a regenerative brake system, the brake control unit 25 may control both of the hydraulic brake system and the regenerative brake system.

Next, a functional configuration of the driving support ECU 22 will be described. The driving support ECU 22 includes the lateral position recognition unit 10, the lane keeping assist unit 11, the lane change operation recognition unit 12, the target lateral position setting unit 13, and a lane change assist unit 26.

The lane change assist unit 26 determines whether the lateral position of the vehicle M recognized by the lateral position recognition unit 10 has reached the previously set lane change assist starting lateral position, during the execution of the lane keeping assist, after the lane change operation recognition unit 12 recognizes the lane change operation by the driver and before the target lateral position setting unit 13 determines that the lane change operation termination condition has been met. When it is determined that the lateral position of the vehicle M has reached the lane change assist starting lateral position based on the recognition result of the lateral position recognition unit 10, the lane change assist unit 26 terminates the lane keeping assist by the lane keeping assist unit 11, and starts the lane change assist.

The lane change assist unit 26 performs the lane change assist that controls the steering and speed of the vehicle M such that the vehicle M makes the lane change from the running lane R1 to the adjacent lane R2, for example, based on the imaging information of the stereo camera 4, the obstacle information of the laser radar 23 and the map data of the navigation system 7. The lane change assist unit 26 checks the presence of an obstacle (another vehicle, construction equipment or the like) that obstructs the lane change to the adjacent lane R2, based on the imaging information of the stereo camera 4 and the obstacle information of the laser radar 23, and controls the vehicle M such that the vehicle M does not contact with the obstacle. The lane change assist unit 26 terminates the lane change assist, when it is determined that the lane change of the vehicle M is completed, for example, based on the imaging information of the stereo camera 4. Here, the lane change assist unit 26 does not always need to use the obstacle information of the laser radar 23 and the map data of the navigation system 7, and may perform the lane change assist based on the imaging information of the stereo camera 4.

Next, a driving support method of the driving support apparatus 21 according to the second embodiment will be described. FIG. 7 is a flowchart showing a driving support method of the driving support apparatus 21 according to the second embodiment.

The flowchart shown in FIG. 7 is repeatedly executed during the execution of the lane keeping assist, for example. Further, the processes of S201, S202, S203 and S205 in the flowchart shown in FIG. 7 are the same processes as S101, S102, S103 and S104 in the flowchart shown in FIG. 3, respectively, and therefore, some of the descriptions are omitted.

As shown in FIG. 7, in step S201, the driving support ECU 22 of the driving support apparatus 21 performs the recognition of the lane change operation by the driver using the lane change operation recognition unit 12. When the lane change operation by the driver is not recognized (S201: NO), the driving support ECU 22 terminates the control process this time. Thereafter, the control process is repeated from step S201 again. On the other hand, when the lane change operation by the driver is recognized (S201: YES), the driving support ECU 22 transitions to step S202.

In step S202, the target lateral position setting unit 13 of the driving support ECU 22 determines whether the steering torque of the steering in the lane change direction by the driver has changed from the lane change waiting threshold or more to less than the lane change waiting threshold, based on the steering information of the steering detection unit 5. When it is determined that the steering torque of the steering in the lane change direction by the driver has not changed from the lane change waiting threshold or more to less than the lane change waiting threshold (S202: NO), the target lateral position setting unit 13 transitions to step S204.

On the other hand, when it is determined that the steering torque of the steering in the lane change direction by the driver has changed from the lane change waiting threshold or more to less than the lane change waiting threshold (S202: YES), the target lateral position setting unit 13 transitions to step S203. In step S203, the target lateral position setting unit 13 sets the lateral position of the vehicle M at the time of the determination of YES in step S202, as the target lateral position T1.

In step S204, the lane change assist unit 26 determines whether the lateral position of the vehicle M recognized by the lateral position recognition unit 10 has reached the lane change assist starting lateral position P. Here, the lane change assist unit 26 sets the lane change assist starting lateral position P, for example, when the lane change operation recognition unit 12 recognizes the lane change operation by the driver in S201. When it is determined that the lateral position of the vehicle M has not reached the lane change assist starting lateral position P (S204: NO), the lane change assist unit 26 transitions to step S205. On the other hand, when it is determined that the lateral position of the vehicle M has reached the lane change assist starting lateral position P (S204: YES), the lane change assist unit 26 transitions to step S206.

In step S205, the target lateral position setting unit 13 determines whether the lane change operation termination condition has been met, for example, based on the input information of the HMI 3 or the operation information of the direction indicator detection unit 6. When it is determined that the lane change operation termination condition has not been met (S205: NO), the target lateral position setting unit 13 returns to step S202 and repeats the process. When it is determined that the lane change operation termination condition has been met (S205: YES), the target lateral position setting unit 13 transitions to step S206.

In step S206, the target lateral position setting unit 13 performs the process to restore the target lateral position to normal. When the new target lateral position T1 has been set in step S203, the target lateral position setting unit 13 restores the initial target lateral position T0, as the process to restore the target lateral position to normal. Thereafter, the process is terminated. When the lane keeping assist is continued even after the elapse of a previously set time, the driving support ECU 22 repeats the process from step S201.

In step S207, the lane change assist unit 26 terminates the lane keeping assist by the lane keeping assist unit 11, and performs the lane change assist for the vehicle M. The lane change assist unit 26 controls the steering and speed of the vehicle M such that the vehicle M makes the lane change from the running lane R1 to the adjacent lane R2, for example, based on the imaging information of the stereo camera 4, the obstacle information of the laser radar 23 and the map data of the navigation system 7. The lane change assist unit 26 terminates the lane change assist to terminate the process, when it is determined that the lane change of the vehicle M is completed based on the imaging information of the stereo camera 4.

Function effects of a driving support apparatus according to the second embodiment will be described. In the driving support apparatus 21 according to the second embodiment described above, when the lateral position of the vehicle M has reached the lane change assist starting lateral position P after the lane change operation by the driver is recognized and before it is determined that the lane change operation termination condition has been met, it is thought that the lane change operation is not a mistake and the driver has moved the vehicle M with the intention of the lane change. Therefore, in this case, the lane keeping assist is terminated, and the lane change assist is started. Consequently, according to the driving support apparatus 21, compared to the related apparatus in which the lane keeping assist is terminated and the lane change assist is performed only by the lane change operation, it is possible to avoid the termination of the lane keeping assist and the start of the lane change assist when the driver performs the lane change operation by mistake. In addition, it is possible to perform the termination of the lane keeping assist and the start of the lane change assist at an adequate timing when the vehicle M reaches the lane change assist starting lateral position P.

Further, the driving support apparatus 21 determines that the lateral position of the vehicle M has reached the lane change assist starting lateral position P (P1), for example, when the lateral position of the vehicle M has reached the position at the previously set first distance E1 from the central position Rc of the running lane R1 toward the lane change direction. According to the driving support apparatus 21, when the lateral position of the vehicle M has reached the lane change assist starting lateral position P, it is thought that the driver has moved the vehicle to the adjacent lane side with the intention of the lane change. Therefore, in this case, the lane keeping assist is terminated, and the lane change assist is started. Thereby, it is possible to perform the termination of the lane keeping assist and the start of the lane change assist at an adequate timing.

Further, the driving support apparatus 21 may determine that the lateral position of the vehicle M has reached the lane change assist starting lateral position P (P2), when the lateral position of the vehicle M has reached the position at the previously set second distance E2 from the target lateral position (the target lateral position T0 or T1) toward the lane change direction. According to the driving support apparatus 21, when the lateral position of the vehicle M has reached the lane change assist starting lateral position P, it is thought that the driver has moved the vehicle from the target lateral position to the adjacent lane side with the intention of the lane change. Therefore, in this case, the lane keeping assist is terminated, and the lane change assist is started. Thereby, it is possible to perform the termination of the lane keeping assist and the start of the lane change assist at an adequate timing. Further, since it is thought that the vehicle M during the execution of the lane change assist is positioned near the target lateral position, the driving support apparatus 21 can adequately determine the intention of the lane change of the driver, by setting the lane change assist starting lateral position P2 on the basis of the target lateral position.

Further, the driving support apparatus 21 may determine that the lateral position of the vehicle M has reached the lane change assist starting lateral position P (P3), when the lateral position of the vehicle M has reached the position at the previously set third distance E3 from the white line L1, which is the boundary between the running lane R1 and the adjacent lane R2, inward of the running lane R1 in the lane width direction. According to the driving support apparatus 21, when the lateral position of the vehicle M has reached the lane change assist starting lateral position P, it is thought that the driver has moved the vehicle M close to the white line L1 with the intention of the lane change. Therefore, in this case, the lane keeping assist is terminated, and the lane change assist is started. Thereby, it is possible to perform the termination of the lane keeping assist and the start of the lane change assist at an adequate timing. Further, in the driving support apparatus 21, the lane change assist starting lateral position P is set on the side of the running lane R1 relative to the white line L1, and therefore, it is possible to avoid a circumstance in which the vehicle M enters the adjacent lane R2 beyond the white line L1 without the start of the lane change assist.

Thus, the embodiments of the invention have been described. The invention is not limited to the above-described embodiments. In addition to the above-described embodiments, the invention can be carried out in a variety of modes in which various modifications and improvements are made based on the knowledge of a person skilled in the art.

What is claimed is:

1. A driving support apparatus for a vehicle comprising a controller,
    the controller configured to perform a lane keeping assist that controls a vehicle such that a position of the vehicle in a width direction of a lane along which the vehicle is running corresponds to a target lateral position in the lane and that reflects steering by a driver of the vehicle in running of the vehicle,
    the controller recognizing a lane change operation by the driver, the lane change operation being an operation by which the vehicle makes a lane change from the lane along which the vehicle is running, to an adjacent lane,
    the controller being configured such that, when it is determined that a steering torque in a lane change direction given by the driver has changed from a predetermined threshold or more to less than the predetermined threshold, the lateral position of the vehicle at the time of the determination is set as the target lateral position, the determination being made, during execution of the lane keeping assist, after the lane change operation is recognized and before it is determined that a previously set lane change operation termination condition indicating that a lane change operation of the driver is terminated has been met.

2. The driving support apparatus for the vehicle according to claim 1, wherein
    when it is determined that the lateral position of the vehicle toward the adjacent lane has reached a previously set lane change assist starting lateral position at which a lane change assist which assists a lane change by the driver starts, the controller terminates the lane keeping assist and starts the lane change assist, the determination being made, during the execution of the lane keeping assist, after the lane change operation is recognized and before it is determined that the previously set lane change operation termination condition has been met.

3. The driving support apparatus for the vehicle according to claim 2, wherein
    when the lateral position of the vehicle has reached a position at a previously set first distance from a central position of the running lane toward the lane change direction in the width direction of the running lane, the controller determines that the lateral position of the vehicle has reached the previously set lane change assist starting lateral position.

4. The driving support apparatus for the vehicle according to claim 2, wherein
    when the lateral position of the vehicle has reached a position at a previously set second distance from the target lateral position toward the lane change direction in the width direction of the running lane, the controller determines that the lateral position of the vehicle has reached the previously set lane change assist starting lateral position.

5. The driving support apparatus for the vehicle according to claim 2, wherein
    when the lateral position of the vehicle has reached a position at a previously set third distance from a lane line inward of the running lane in the width direction of the running lane, the controller determines that the lateral position of the vehicle has reached the lane change assist starting lateral position, the lane line being a boundary between the running lane and the adjacent lane.

6. The driving support apparatus for the vehicle according to claim 1, wherein
    before it is determined that the steering torque of the steering in the lane change direction by the driver has changed from the predetermined threshold or more to less than the predetermined threshold, the controller sets a substantially central position of the lane along which the vehicle is running, as the target lateral position for the lane keeping assist, the substantially central position being a position in the width direction of the lane, and when it is determined that the steering torque of the steering in the lane change direction by the driver has changed from the predetermined threshold or more to less than the predetermined threshold, the controller sets the lateral position of the vehicle at the time of the determination, as the target lateral position for the lane keeping assist.

7. A driving support method for a vehicle comprising:

performing a lane keeping assist that controls a vehicle such that a position of the vehicle in a width direction of a lane along which the vehicle is running corresponds to a target lateral position in the lane and that reflects steering by a driver of the vehicle in running of the vehicle;

recognizing a lane change operation by the driver, the lane change operation being an operation by which the vehicle makes a lane change from the lane along which the vehicle is running, to an adjacent lane; and setting a lateral position of the vehicle as the target lateral position, when it is determined that steering torque of the steering in a lane change direction given by the driver has changed from a predetermined threshold or more to less than the predetermined threshold, the lateral position of the vehicle being the lateral position of the vehicle at the time of the determination, the determination being made, during execution of the lane keeping assist, after the lane change operation is recognized and before it is determined that a previously set lane change operation termination condition indicating that a lane change operation of the driver is terminated has been met.

* * * * *